United States Patent [19]

Bucaro et al.

[11] 4,238,856
[45] Dec. 9, 1980

[54] FIBER-OPTIC ACOUSTIC SENSOR

[75] Inventors: Joseph A. Bucaro, Herndon, Va.;
Edward F. Carome, Palo Alto, Calif.

[73] Assignee: The United States of America as represented by the Secretary of the Navy, Washington, D.C.

[21] Appl. No.: 6,149

[22] Filed: Jan. 24, 1979

[51] Int. Cl.³ .............................................. H04B 9/00
[52] U.S. Cl. ..................................... 455/614; 73/655;
179/113; 350/96.13; 358/112; 358/901;
455/605; 455/610; 455/612
[58] Field of Search ........................ 179/113; 250/199;
340/15, 15.5 R, 17 R; 350/96.13; 455/605, 610,
612, 614; 73/655; 358/112, 901

[56] References Cited

U.S. PATENT DOCUMENTS

| | | | |
|---|---|---|---|
| 2,972,051 | 2/1961 | Baum | 250/474 |
| 4,068,191 | 1/1978 | Zemon | 350/96.13 |
| 4,162,397 | 7/1979 | Bucaro | 250/199 |

*Primary Examiner*—Howard W. Britton
*Attorney, Agent, or Firm*—R. S. Sciascia; Philip Schneider; Melvin L. Crane

[57] ABSTRACT

An optical fiber acoustical sensor for detecting sound waves in a fluid medium. An optical fiber coil through which a light beam is transmitted is placed in a fluid medium. A sound wave propagating through the fluid medium and incident on the optical fiber coil changes the index of refraction and the length of the optical fiber at the area of incidence. These changes cause a shift in the transmitted light which is detectable to denote the presence of the sound wave.

6 Claims, 4 Drawing Figures

U.S. Patent     Dec. 9, 1980     4,238,856

FIBER-OPTIC ACOUSTIC SENSOR

BACKGROUND OF THE INVENTION

This invention relates to optical fibers and more particularly to the use of an optical fiber for the detection of sound waves in a fluid medium.

Heretofore sound waves have been detected by different types of electromechanical devices such as capacitance microphones, and piezoelectroic and magnetostrictive transducers. These yield an electrical output signal when exposed to incident sound waves. Such devices provide a means for directly obtaining an electrical signal that varies in time in the same way that the pressure varies in the sound field. Some of the disadvantages of such systems are: they are bulky, expensive and require impedance matching between the sound detector and transmission and signal-processing system.

Optical waveguides and optical fibers have been used for conducting optical radiation from one point to another. Uses of such systems have been contemplated in the communication field for communicating optical signals and messages from one place to another. Other systems made use of stress applied to an optical fiber to modulate the optical radiation as it is transmitted through the fiber (for instance, see U.S. Pat. No. 4,068,191).

An article, "Optical Hydrophones for Sonar", by J. A. Bucaro, IEEE Publication 78 CH 1354-4AES, pp 298–302, September 1978, describes a fiber-optic hydrophone which uses a reference beam fiber and a sensing-beam fiber. The two beams are directed through the fibers, recombined, and allowed to interfere on the surface of a detector to detect acoustical energy incident on the sensing optic fiber. This subject matter has been set forth in Patent Application, Ser. No. 920,091, filed June 28, 1978, now U.S. Pat. No. 4,162,397.

Another system which makes use of an optical fiber coil through which optical radiation is transmitted is disclosed in U.S. Pat. No. 2,972,051. This patent is for the detection of ionizing radiation which permanently changes the optical index of the optical fiber. Further use of such a system has been set forth by George H. Segal et al. in an article "New Real Time dosimeters Use Fiber Optics" in *Naval Research Laboratory Research and Development Highlights*, Vol. 1, No. 1, pp. 7 and 8, December 1974.

SUMMARY OF THE INVENTION

This invention comprises an optical fiber a portion of which is formed into a coil which functions as a sensor for acoustical signals. Acoustical signals incident on the optic fiber coil change the index of refraction of the optic fiber as well as the diameter and length of the fiber at those sections upon which the signal is incident. These changes have an optical effect on optical radiation passing through the fiber, which modulates the radiation passing through the optic fiber. These changes in the optical radiation output signals are detected and are proportional to the incident acoustic-wave.

DETAILED DESCRIPTION

Figure 1:
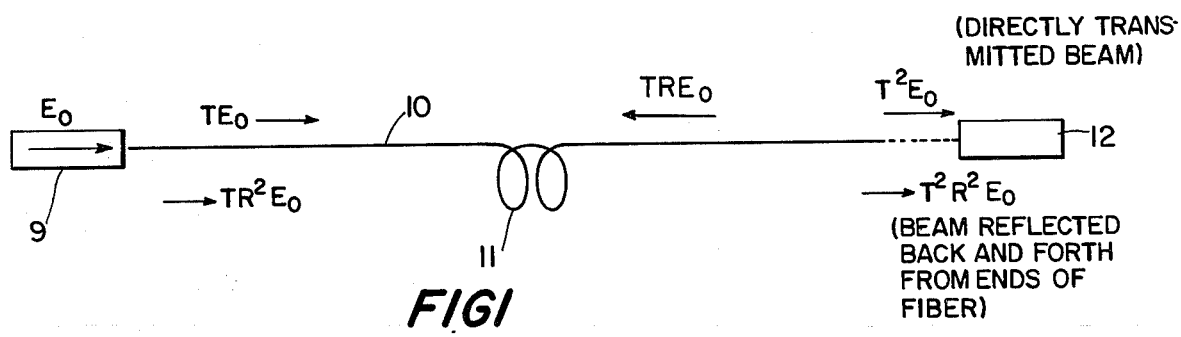
FIG. 1 illustrates a single optical fiber phase-sensitive detector.

FIG. 1 illustrates a single optical fiber phase-sensitive acoustical wave detector. The acoustic wave detector includes a single-mode optic fiber 10 with a portion of the optic fiber formed into an acoustic wave sensor coil 11. The ends of the single-mode optic fiber are cut perpendicularly to the axis or any other suitable arrangement by which the optical beams are internally backreflected by the ends of the fiber. The backreflected beams remain as beam excitation of the single propagating mode thereby producing beat signal interactions between the various propagated beams. In using a single single-mode optic fiber, acoustical waves are detected by the relative phase shift between the separate beams. Thus, from the exit end of the fiber, there is a series of coherent beams, the first of amplitude $T^2E_0$ and the second $T^2R^2E_0$, where T and R are the amplitude transmission and reflection coefficients, respectively, and $E_0$ is the optical amplitude in the optic fiber. It has been determined that the relative acoustically induced phase shift between these two beams is twice that of a beam that makes a single pass through the fiber. The optical source must be a highly coherent laser 9 with a coherence length more than twice the optical fiber coil length. The optical reflection coefficients at each end of the fiber may be varied to optimize the amplitude of the beat signal. The signal from the optical fiber is directed on a photodetector 12 whose output may be analyzed to determine the phase shift representative of an acoustical signal detected by the coil. The use of a single optic fiber as a sensor device greatly simplifies the system.

Figure 2:
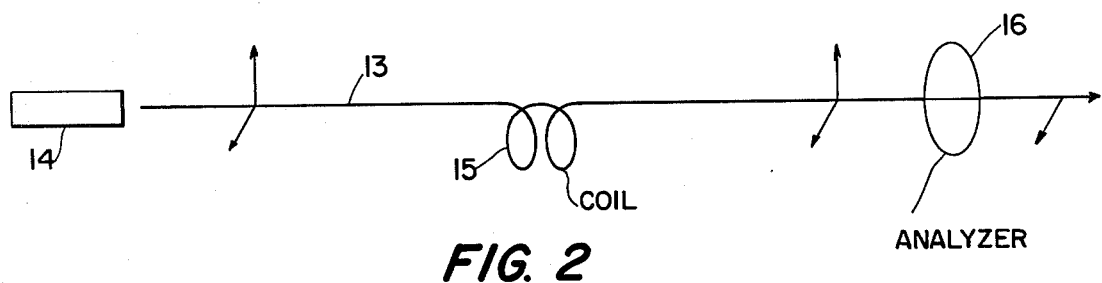
FIG. 2 illustrates a modified detector based on optical polarization rotation.

FIG. 2 refers to a single-mode fiber 13 which may have an elliptical core through which an incident polarized beam is directed. The fiber is formed into an acoustical signal sensor coil 15 along its length and is provided with a polarization analyzer 16. Acoustic signals produce some transitions from polarization in one direction to the other direction, leading to intensity modulation of the output signal. The arrows show the polarization. This modification may be used with either coherent or incoherent polarized light from source 14. The output beam is detected and analyzed by the polarization analyzer which indicates any change in polarization due to an acoustical signal incident on the coil 15.

Figure 3:
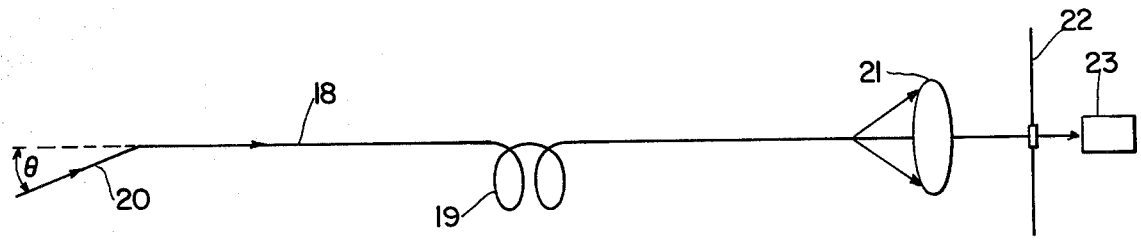
FIG. 3 illustrates a single continuous optical fiber detector utilizing optical mode-mode coupling.

FIG. 3 illustrates an optical fiber sensor utilizing optical mode-mode coupling. A single optical fiber 18 that supports many different optical modes is formed into an acoustic signal sensor coil 19 along its length. Optical radiation 20 is injected into a selected range of modes either by controlling the angle of incident radiation or using optical masks to produce spatially incident fields that match a given mode. At the output end of the optical fiber, the detector's acceptance angle or spatial filtering characteristics are optically controlled to monitor radiation from a second range of modes. Acoustic signals incident on the sensor coil causes a change in the coupling between the two sets of modes and the intensity of the output beam is modulated thereby producing a detectible signal proportional to the acoustic signal incident on the sensor coil. As shown, the main exit beam pattern 21 is directed onto a mask 22 through which the radiation passes. The mask limits the spread of the beam prior to detection by the detector 23.

Figure 4:
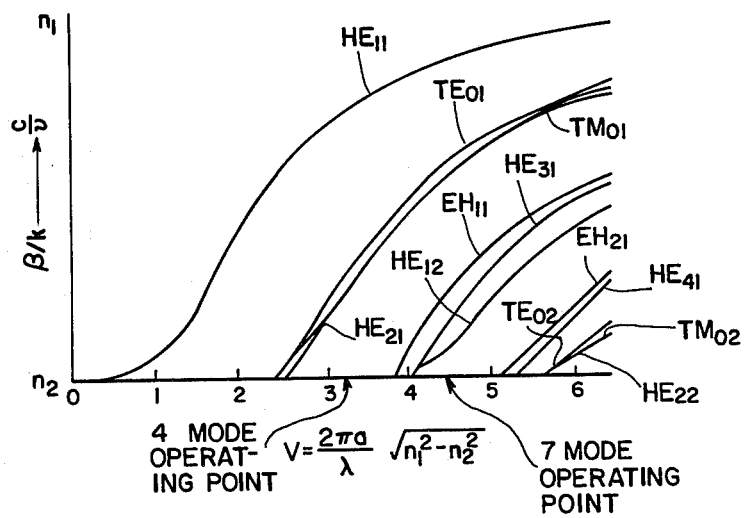
FIG. 4 illustrates normalized propagation constants as a function of V-parameters for a few of the lowest-order modes of a step waveguide.

The single optic fiber may be constructed during manufacture in such a manner that it will support propagation of only a few modes, that is, four or seven. By selectively exciting two particular modes, acoustic irradiation incident on a coil in its length may be detected by homodyning the output signal. By homodyning the output signal, the difference in the acoustically produced phase shifts for the two particular modes may be measured. The relative phase shift may be made larger by using a step index fiber with a larger index of refraction difference between the core and cladding. FIG. 4 illustrates the normalized propagation constant as a function of V-parameter (a parameter characterizing the fiber) for a few of the lowest order modes of a step waveguide.

As an example of operation of the multimode optical fiber, a 28 meter length of step-index fiber with a V value of 4.0 was used to form a 5 cm diameter coil containing 26 meters of the fiber. An argon-ion laser operating at 514.5 nm was used to excite the fiber through a 10 × microscope objective, the lateral and angular orientation of the fiber end was adjustable to achieve a degree of mode selection. The light distribution at the output end of the fiber was magnified and imaged onto a RCA 7265 photomultiplier tube configured with a 0.05 cm aperature with an image measurement of 1.9 cm in diameter. The aperature was placed near the center of one lobe of the image where the beat between the $HE_{11}$ and $TM_{01}$ modes was maximum. The fiber coil was positioned with the plane of the coil perpendicular to the direction of the acoustical signal. The detected signal results from differences in acoustically induced phase shifts between two different waveguide modes propagating in the fiber.

When the fiver was insonified two signals were observed in the photocurrent and were identifiable by their associated frequency spectra. One signal results from the radiation passing straight through the optical fiber. The other signal results from "beating" between light passing straight through the fiber and light reflected back through the fiber from the fiber terminations.

The sensitivity can be increased by increasing the length of the fiber coil and by making a fiber specifically for acoustical sound wave detection. The fiber used was of the type made for optical communication systems.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optic fiber acoustic wave sensor which comprises:
    a single radiation-transmitting optic fiber, an optical characteristic of which is sensitivity to acoustical waves,
    said optic fiber being constructed to reflect internally propagating optical radiation at both ends so that beat oscillations are produced,
    said optic fiber including a coil of any geometry along its length;
    means for directing optical radiation into one end of said optic fiber;
    means for detecting optical radiation beat oscillations passing through said optic fiber and for converting said optical radiation to an electrical signal output; and
    means for monitoring the output signals due to acoustical waves incident on said coil.

2. An acoustic wave sensor as claimed in claim 1 wherein:
    said optical radiation directed into said optic fiber is polarized, and
    said output beam passes through a polarization analyzer.

3. An acoustic wave sensor as claimed in claim 1 wherein:
    said beam directed into said optic fiber is at an angle relative to the fiber axis, and
    a mask is placed adjacent to the output end through which optical radiation passes to allow detection of energy in different modes.

4. An acoustic wave sensor as claimed in claim 1 wherein:
    said beam directed into said optic fiber is masked in such a manner as to selectively excite a preferred group of modes, and
    a mask is placed adjacent to the output end through which optical radiation passes to allow detection of energy in different modes.

5. An acoustic wave sensor as claimed in claim 1 which comprises:
    means for producing internally back-reflected beams within said optical fiber for excitation of a single propagation mode.

6. An acoustic wave sensor as claimed in claim 5 in which:
    said means for producing internally back-reflected beams within said optical fiber are partially reflective fiber ends.

* * * * *